Oct. 2, 1956
J. L. ARTHUR
2,764,896
PULLEYS
Filed Oct. 20, 1953
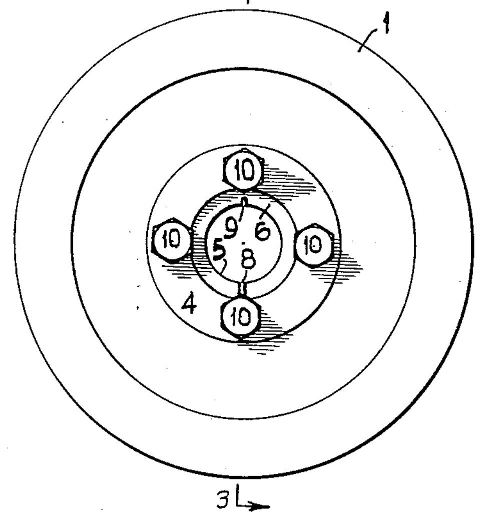
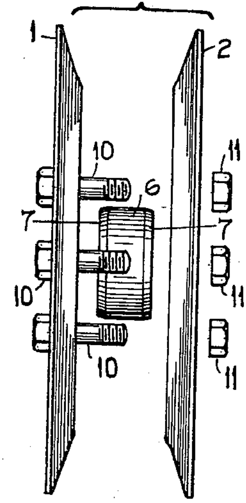
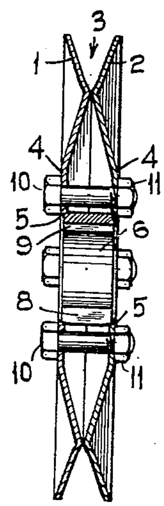
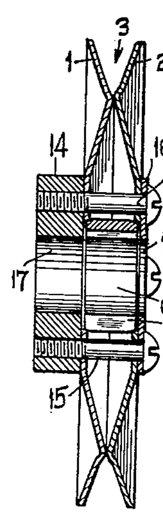
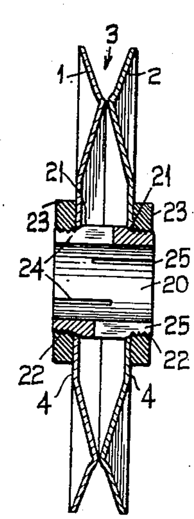
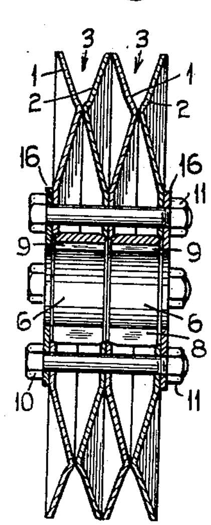

United States Patent Office 2,764,896

Patented Oct. 2, 1956

2,764,896

PULLEYS

John Lord Arthur, Kent Town, South Australia, Australia, assignor to Pulleys (Aust.) Limited, Adelaide, South Australia, Australia, a corporation of South Australia Application October 20, 1953, Serial No. 387,232

Claims priority, application Australia December 1, 1952

4 Claims. (Cl. 74—230.8)

This invention relates to improvements in and to pulleys and in particular it relates to pulleys of the V groove type.

The manufacturer of V groove pulleys usually consists in casting or otherwise forming a pulley in a suitable metal and machining the grooves into same, although it has been proposed heretofore to form these pulleys by pressing from sheet metal or the like and assembling the pressed parts to form the pulleys.

According to one of the already known methods each pulley comprises two pressed steel members which are so shaped that when they are turned to be assembled on a shaft about a medial line and screwed together they are claimed to engage the shaft with a driving fit.

It is the object of this invention, however, to provide an improved form of pulley of this type in which a number of advantages will be attained such as an effective driving fit on the shaft and if required the provision of different mountable centres to allow a pulley to be fitted to shafts of different sizes.

In brief the invention consists in the use of at least two side-forming members which are preferably of complementary shape so that when they are placed in position on a shaft about a medial line they will form the V groove for the belt, but instead of these members directly engaging the shaft they are engaged on, or by, a compressible locking piece which is so constructed that, when means holding the side-forming members of the pulley together are tightened, the locking piece will automatically be rigidly engaged on the shaft and the side forming members of the pulley so that the pulley is then rigidly locked to the shaft while the side-forming members thereof are rigidly locked together.

In order, however, that the invention may be more fully understood it will now be described with reference to the accompanying drawings in which:

Fig. 1 is a side elevation of a pulley constructed according to this invention,

Fig. 2 is an exploded end elevation of same showing the parts that go to make up the pulley, Fig. 3 is a section of same on line 3—3 of Fig. 1, Fig. 4 is a central transverse section corresponding to Fig. 3 but showing a modified form of pulley, Fig. 5 shows a further modification of the pulley, and Fig. 6 is a view corresponding to Fig. 3 but showing how multiple pulleys can be made up using the parts of this invention.

Referring first to the pulley shown in Figs. 1 to 3, it will be seen that this consists of a pair of disc-like side-forming members 1 and 2 of identical shape but in use placed back to back so that they form between them a belt groove 3 and spaced apart central bosses 4 having a central opening terminating in the edge 5.

Inserted between the central bosses 4 to engage the edge 5 is a locking piece 6 which has its two ends 7 chamfered so that these chamfered portions engage the edge 5 of the central boss 4. The locking piece 6 is provided with a split 8 diametrically opposite a groove 9 so that this locking piece 6 can be forced inwards on to a shaft over which it has been placed, the forcing inwards of this being effected by tightening bolts 10 which pass through apertures in the central bosses 4 and have nuts 11, the forcing inward of the central bosses 4 by tension of these bolts having the effect of forcing the edges 5 of the central bosses 4 on to the chamfered portion 7 of the locking piece 6 and therefore tending to collapse the locking piece 6 inwards on to the shaft because the locking piece has a split 8 or would otherwise be slotted to allow it to be distorted inwards.

If it is desired to provide a larger bearing surface on the shaft and also to utilise a set screw or other device to further secure the pulley on the shaft, the pulley may have a boss 14 secured on its one side by set screws 15 or the like as shown in Fig. 4 of the drawings, a washer 16 being used if such is desired so that the pulley is aligned on the shaft by having the aperture 17 of the boss 14 a sliding fit on the shaft and the aperture 18 of the washer 16 also a sliding fit on the shaft. The central boss 4 is shown similar to that described with reference to the foregoing embodiment and, in each of the figures of the drawings where similar parts appear, the same reference numerals are used to indicate such parts, the two side-forming members 1 and 2 between which the belt groove 3 is formed being similar in the embodiment shown in this figure to the side-forming members of the previously described embodiment.

In the embodiment shown in Fig. 5 the side-forming members 1 and 2 are pulled together on to a modified form of locking piece 20, the locking piece in this case being extended beyond the chamfered portions 21 to form screw-threaded projections 22 on to which nuts 23 are engaged, the action of the nuts 23 being again to force the bosses 4 of the side-forming members 1 and 2 inwards on to the chamfers 21, which action is also assisted by the nuts 23 operating on the threads due to the angle of the threads, to force particularly the outer edges of the locking piece 20 down on to the shaft. In this case to given uniform distribution of the locking effect the locking piece 20 is provided with three slots 24 on one side and three slots 25 on the other side.

In the modification shown in Fig. 6 in which the same parts are used as in the first described embodiment of the invention excepting that the bolts 10 have been extended, the same reference numerals are used as in Figs. 1, 2 and 3 and the various parts need no description for it will be seen that this is merely a duplication of the form shown in Fig. 3, the two grooves 3 being formed between side-forming members 1 and 2 and two locking pieces 6 being also used. It will be realised that the number of grooves can be varied as it is quite possible to make up multi-groove pulleys in any number by simply continuing to build on sets of units and to pull the complete assemblies together by passing bolts of sufficient length through all of the sections of the multiple groove pulley so formed. The one variation of this figure from that shown in Figs. 1, 2 and 3 is the inclusion of the washers 16 used in the embodiment shown in Fig. 4 but the device may be used with or without these or could utilise a boss similar to the boss 14 which can have a grub screw or other locking means if such was felt to be desirable.

From the foregoing it will be appreciated that an improved pulley is provided which can be readily formed by pressing or otherwise shaping identical side-forming members which can be built up to form single groove pulleys or multi-groove pulleys without requiring a variation in shape and which are locked together by suitable means which also lock them on to a locking piece which in turn locks the pulley on to a shaft.

I claim:

1. A pulley assembly comprising a cylindrical core having right angular flat ends and chamfers on each end of the core and an axial bore of approximately the size of the shaft to which the core is to be applied, said core being provided with a radial slot extending all the way through from the bore to the periphery on one side of said core; a disc-like side plate mounted on each end of said core, each of said side plates being provided with a central opening terminating in an edge and providing edge contact between the plate and the chamfers of the core, said openings being of a diameter greater than the smaller diameter of said chamfers and less than the larger diameter of said chamfers, said plates being provided with a plurality of circumferentially spaced holes adjacent said openings extending axially therethrough and means extending through said holes for drawing said plates together axially on said core whereby said plates may be forced axially on said chamfers to close said slot and lock said core on a shaft, the engagement of the openings of said side plates with said chamfers providing a connection therebetween, said plates having cooperating structure adjacent their peripheries to define a V belt groove when assembled on said core.

2. A pulley assembly comprising a cylindrical core having right angular flat ends and chamfers on each end of the core and an axial bore of approximately the size of the shaft to which the core is to be applied, said core being provided with a radial slot extending all the way through from the bore to the periphery on one side of said core; a disc-like side plate mounted on each end of said core, each of said side plates being provided with a central opening terminating in an edge and providing edge contact between the plate and the chamfers of the core, said openings being of a diameter greater than the smaller diameter of said chamfers and less than the larger diameter of said chamfers, said plates being provided with a plurality of circumferentially spaced holes adjacent said openings extending axially therethrough and means extending through said holes for drawing said plates together axially on said core whereby said plates may be forced axially on said chamfers to close said slot and lock said core on a shaft, the engagement of the openings of said side plates with said chamfers providing a connection therebetween, said plates having cooperating structure adjacent their peripheries to define a V belt groove when assembled on said core and to provide abutment means for spacing them axially on said core.

3. A pulley assembly comprising a cylindrical core having right angular flat ends and chamfers on each end of the core and an axial bore of approximately the size of the shaft to which the core is to be applied, said core being provided with a radial slot extending all the way through from the bore to the periphery on one side of said core; a disc-like side plate mounted on each end of said core, each of said side plates being provided with a central opening terminating in an edge and providing edge contact between the plate and the chamfers of the core, said openings being of a diameter greater than the smaller diameter of said chamfers and less than the larger diameter of said chamfers, and screw threaded means mounted on said assembly for forcing said plates together axially on said core whereby said plates may be forced axially on said chamfers to close said slot and lock said core on a shaft, the engagement of the openings of said side plates with said chamfers providing a connection therebetween, said plates having cooperating structure adjacent their peripheries to define a V belt groove when assembled on said core.

4. A multiple pulley comprising a plurality of pulley assemblies mounted in end to end abutting relationship on a shaft, wherein each pulley assembly comprises a cylindrical core having right angular flat ends and chamfers on each end of the core and an axial bore of approximately the size of the shaft to which the core is to be applied, said core being provided with a radial slot extending all the way through from the bore to the periphery on one side of said core; a disc-like side plate mounted on each end of said core, each of said side plates being provided with a central opening terminating in an edge and providing edge contact between the plate and the chamfers of the core, said openings being of a diameter greater than the smaller diameter of said chamfers and less than the larger diameter of said chamfers, each of said plates of the multiple pulley being provided with a plurality of mating circumferentially spaced holes adjacent said openings extending axially therethrough and single bolt means extending through the mating holes of all the plates of the multiple pulley for drawing said plates of each assembly together axially on said cores, whereby said plates may be forced axially on said chamfers to close each slot and lock each core on the shaft, the engagement of the openings of said side plates with said chamfers providing a connection therebetween, said plates of each assembly having cooperating structure adjacent their peripheries to define a V belt groove when assembled on said core, and to provide abutment means for spacing them axially on said core, the abutment of said assemblies being at the portion adjacent said openings and the peripheral portions of said plates.

References Cited in the file of this patent

UNITED STATES PATENTS

| | | |
|---|---|---|
| 209,147 | Taylor | Oct. 22, 1878 |
| 525,775 | Wainwright | Sept. 11, 1894 |
| 1,184,025 | Rothenbucher | May 23, 1916 |
| 1,400,442 | Kilcullen | Dec. 13, 1921 |
| 1,562,937 | Beardsley et al. | Nov. 24, 1925 |
| 2,326,866 | Kincaid, Jr. | Aug. 17, 1943 |
| 2,610,515 | Williams | Sept. 16, 1952 |
| 2,717,814 | Archer | Sept. 13, 1955 |

FOREIGN PATENTS

| | | |
|---|---|---|
| 622,461 | Great Britain | May 3, 1949 |
| 670,392 | Great Britain | Apr. 16, 1952 |
| 97,831 | Austria | Sept. 10, 1924 |